United States Patent [19]
Reichard et al.

[11] Patent Number: 5,704,704
[45] Date of Patent: Jan. 6, 1998

[54] MARINE POLE LIGHT AND BASE

[75] Inventors: Brent A. Reichard, Greenville; Bruce Reniger, Alto; Terry L. Lautzenheiser, Grand Haven; Clifton J. Ratza, Grand Rapids, all of Mich.

[73] Assignee: Attwood Corporation, Lowell, Mich.

[21] Appl. No.: 419,041

[22] Filed: Apr. 10, 1995

[51] Int. Cl.$^6$ ............................................. B60Q 1/00
[52] U.S. Cl. ........................ 362/1; 362/226; 362/431; 362/267; 362/329
[58] Field of Search ..................... 362/61, 80, 226, 362/431, 410, 414, 267, 307, 294, 329, 373, 296, 341; 439/743, 744, 746, 619

[56] References Cited

U.S. PATENT DOCUMENTS

| | | |
|---|---|---|
| D. 184,988 | 4/1959 | DeHart . |
| D. 316,159 | 4/1991 | Whitely, II . |
| 2,297,916 | 10/1942 | Sauer ............................ 362/431 |
| 2,501,284 | 3/1950 | Miller et al. . |
| 2,575,601 | 11/1951 | Staver . |
| 2,871,342 | 12/1959 | Mappes . |
| 2,938,109 | 5/1960 | Coleman . |
| 3,041,571 | 6/1962 | Friend et al. . |
| 3,043,949 | 8/1962 | Smith . |
| 3,192,376 | 6/1965 | Najimiam, Jr. . |
| 3,253,136 | 5/1966 | Faul ............................... 362/363 |
| 3,297,976 | 1/1967 | Velardocchia . |
| 3,517,184 | 6/1970 | Norton et al. ................. 362/61 |
| 3,656,105 | 4/1972 | Steltzer . |
| 3,679,891 | 7/1972 | Qauck ............................ 362/431 |
| 3,833,800 | 9/1974 | Stewart et al. . |
| 3,900,725 | 8/1975 | Komon ........................... 362/226 |
| 4,245,281 | 1/1981 | Ziaylek, Jr. . |
| 4,856,452 | 8/1989 | Pingol et al. ................... 362/61 |
| 4,884,173 | 11/1989 | Cassidy . |
| 5,268,824 | 12/1993 | Czipri . |
| 5,285,359 | 2/1994 | Czipri . |
| 5,339,225 | 8/1994 | Wiggerman ................... 362/61 |

OTHER PUBLICATIONS

"Perko© Navigation Light Selection Chart," 1990.
2 pages of Perko Catalog, Feb. 1995.
"Boating Lighting and Accessories," *Hellamarine*, 1994.
Aqua Signal© Catalog, 1994.
Attwood Catalog, pp. 26–44, 1992–93.

*Primary Examiner*—Thomas M. Sember
*Attorney, Agent, or Firm*—Price, Heneveld, Cooper, DeWitt & Litton

[57] ABSTRACT

A pole light system for marine craft, which is easily mounted and dismounted and includes a base receptacle having a keyed socket, and a pole having a light assembly at one end and a plug at the other end which is keyed to be received in the socket, whereby insertion of the pole into the socket is limited to a preselected orientation which will permit the use of wiping, self-cleaning electrical contacts on the pole and receptacle. The light assembly includes a base which is securable to the pole, a planar reflector disposed on the base, a hemispherical Fresnel lens which, together with the reflector, define a volume wherein a light bulb is disposed via a two-part, wire form retainer. The reflector which is generally positioned below the lightbulb, in combination with a hemispherical Fresnel lens, efficiently utilize light emitted from the bulb, so that a lower wattage bulb requiring less energy and producing less heat can be used to achieve a desired illumination in a smaller light assembly.

11 Claims, 5 Drawing Sheets

MARINE POLE LIGHT AND BASE

BACKGROUND OF THE INVENTION

This invention relates to a marine pole light assembly of the type including a base or receptacle adapted to be mounted onto the deck or other suitable support surface of a marine craft and a detachable pole light receivable in the receptacle.

Marine vessels operating at night or under other conditions of poor visibility are required to carry an all-round light which shows an unbroken light over an arc of the horizon of 360 degrees. The all-round light should be visible for at least two miles (three miles for vessels over fifty meters in length), and be elevated at a height of at least one meter above the sidelight also required on such craft.

In order to comply with these requirements, a pole light is generally used. It is often desirable, especially for smaller craft, to use a pole light which is detachably mounted in a pole base or receptacle, so that the pole can be removed during good visibility conditions to reduce obstructions which interfere with normal boating activities and to reduce exposure of the light assembly to spray, splash, and weather. The receptacle generally has an opening or socket containing electrical contacts which are engaged by electrical contacts on the pole. To properly engage the electrical contacts and secure the pole to the receptacle, most pole light systems require that the pole be twisted or rotated during insertion into the receptacle. Some other pole light systems have electrical contacts which are generally symmetrical with, and spaced along, the axis of the tube. Coleman (U.S. Pat. No. 2,938,109), for example, discloses such pole light. Although such pole lights having symmetrical coaxial contacts can be inserted into a receptacle to achieve electrical connection of the contacts in the pole with those in the base without twisting or rotating the pole, one of the coaxially spaced electrical contacts on the pole and the corresponding electrical contact on the receptacle do not wipingly engage one another during insertion of the pole into the base. The inability of these contacts to wipe against one another during insertion of the pole into the receptacle prevents them from cleaning one another, which in turn means that after a period of time it will be necessary to manually remove dirt, metal oxide, and other contamination from the contacts to ensure good electrical connection. Accordingly, it would be desirable to have a pole light which can be inserted directly into a receptacle without any rotation, twisting, or supplemental manual fastening, and wherein both of the electrical contacts on the pole wipingly engage a corresponding contact on the receptacle so that the contacts clean themselves during mounting of the pole to the receptacle and removal of the pole from the receptacle.

Another disadvantage of known pole light systems is that water and other materials can collect in the base or receptacle and subsequently adversely affect operation of the pole light. Accordingly, a pole light receptacle which does not accumulate water or other materials would be desirable.

A further disadvantage with known pole lights is that the light assembly is generally relatively large because of the size of the housing needed to effectively dissipate heat generated by high wattage bulbs used to meet the two mile visibility requirement. Accordingly, it would also be desirable to provide an all-around light assembly which utilizes the light emitted from the bulb more effectively, so that the size, energy requirement, and heat generated by the bulb can be reduced, whereby a more compact light assembly can be provided.

SUMMARY OF THE INVENTION

The invention provides a simple, reliable pole light system comprising a pole having a light at one end and which is mountable at the other end to a base secured to a deck or other suitable surface of a marine craft. The pole includes a plug keyed to be received within a keyed socket in the base so that the pole can be inserted into the socket and securely retained therein without rotating or twisting the pole. The pole light assembly of the present invention employs a simple, efficient design which has few parts which are easily assembled and includes a light at the top of the pole which efficiently utilizes light emitted from a small, low energy lightbulb which generates less heat and thereby allows for a more compact assembly. The base of the pole light assembly includes a cap having a seal member which prevents water and other materials from entering the base when the pole is removed therefrom. The base is also preferably open at the bottom to allow water and other materials which inadvertently enter the base to quickly drain therefrom.

In accordance with one aspect of the invention, there is provided a pole light system including a receptacle having a keyed socket, a pole which has a plug adapted to be received in the socket without twisting the pole, and self-cleaning electrical contacts which wipingly engage each other during insertion of the pole into, or removal of the pole from, the receptacle.

A further aspect of the invention is the provision of a hinged cap pivotally secured to the receptacle which can be pivoted between an open position which allows the pole to be mounted in the receptacle, and a closed position wherein the cap covers the pole receiving opening in the receptacle to prevent water or other materials from entering.

In accordance with a still further aspect of the invention a light assembly is provided which more effectively utilizes light emitted from a light bulb by housing the bulb in a generally hemispherical-shaped volume defined by a planar reflective surface and a hemispherical Fresnel lens. The more effective utilization of light allows a desired illumination using a smaller bulb which generates less heat and can be confined in a smaller housing.

In accordance with a preferred mode of practicing the invention, the base is provided with an upper flange having fastener openings for securing the base to the deck of a marine craft, and a cap which is sized and shaped to cover and conceal the fastener openings in the flange at the top of the base. The base preferably includes an internal passageway having an internal shoulder which is engaged by an external detent on a flange skirt depending from the pole to secure the pole to the base by a frictional interference fit. The electrical contacts on the base preferably have a convex surface which engages the electrical contacting surfaces of the pole.

In accordance with another preferred mode of practicing the invention, the bulb in the light assembly is retained by a two-part wire form retainer which holds the bulb in place and also serves as an electrical conductor contacting the terminals of the bulb.

The foregoing features and aspects of the invention overcome the disadvantages of the prior art set forth above. More specifically, the invention provides a pole light assembly in which insertion of the pole into the socket is limited to a preselected orientation which permits the use of wiping, self-cleaning electrical contacts thereby eliminating the need for frequent manual cleaning of the electrical contacts, and further provides a light assembly which efficiently utilizes light emitted from a lightbulb so that a lower wattage bulb requiring less energy and producing less heat can be used, whereby a desired amount of illumination can be achieved in a smaller light assembly, and a pole having a keyed plug which frictionally engages a keyed socket to allow quick and easy insertion and removal of the pole from the base.

These and other features, objects, and benefits of the invention will be recognized by those who practice the invention and by those skilled in the art, from the specification, the claims, and the drawing figures.

DESCRIPTION OF THE PREFERRED EMBODIMENTS

The words "upper," "lower," "inner," "outer," and other similar words which describe spatial relationships should be interpreted by reference to the drawings.

Figure 1:
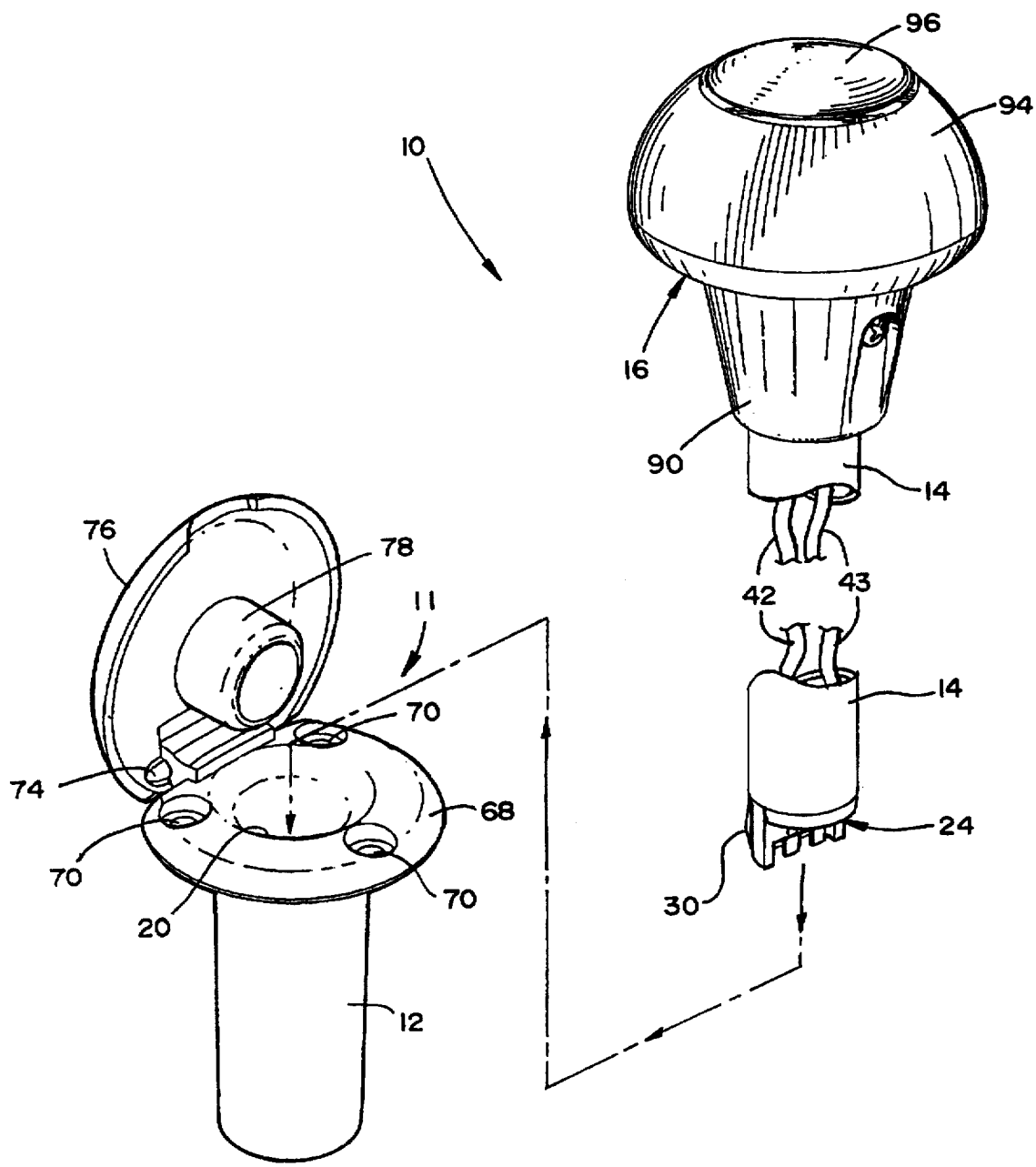
FIG. 1 is an exploded perspective view showing the components of the pole light assembly.
Figure 2:
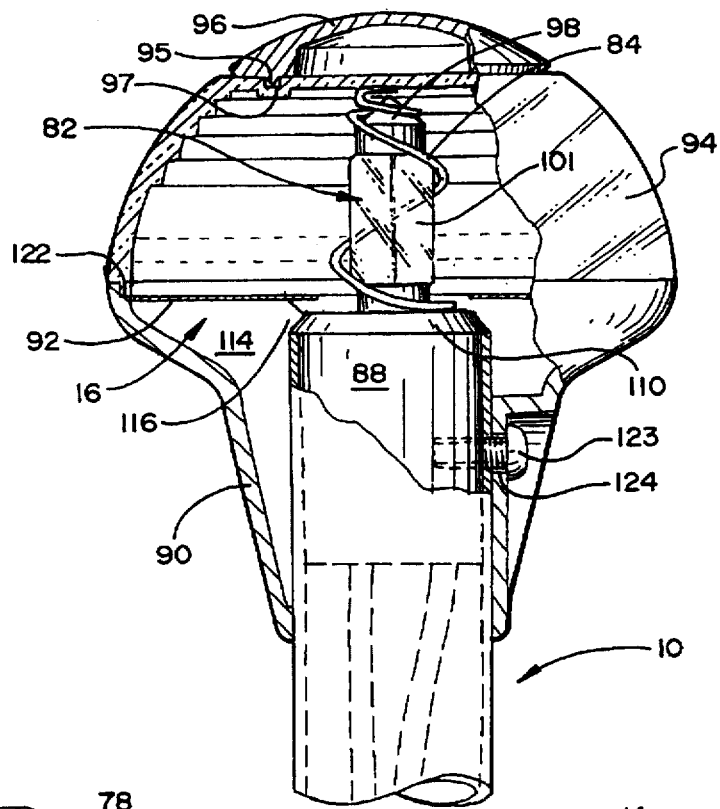
FIG. 2 is a side elevational, cross-sectional view of a pole light inserted into a pole receptacle, both in accordance with the invention.

FIGS. 1 and 2 show a pole light assembly 10 for a marine craft, which in accordance with the invention, includes a pole base 11 having a receptacle 12 adapted to receive the lower end of a detachable pole 14 having a light assembly 16 secured to the top end thereof. The pole base receptacle 12 has a generally tubular shape with a substantially cylindrical passageway 18 passing therethrough. The inner diameter of the cylindrical passageway widens below the top opening 20 of the receptacle 12 and forms a shoulder 22, e.g., a conical section where the inner diameter of the cylindrical passageway 18 increases along the downward direction of the longitudinal axis of the passageway. The bottom end of the pole 14 includes a molded plastic plug or connector 24 preferably formed from polypropylene and having upstanding cylindrical sector securing walls 26 for securing the connector to the internal walls of the tubular pole 14 by way of a frictional interference fit, and a resiliently biased depending flange skirt 28 having an external detent 30 which engages shoulder 22 to detachably secure the pole 14 in the receptacle 12 by way of an interference fit.

Figure 3:
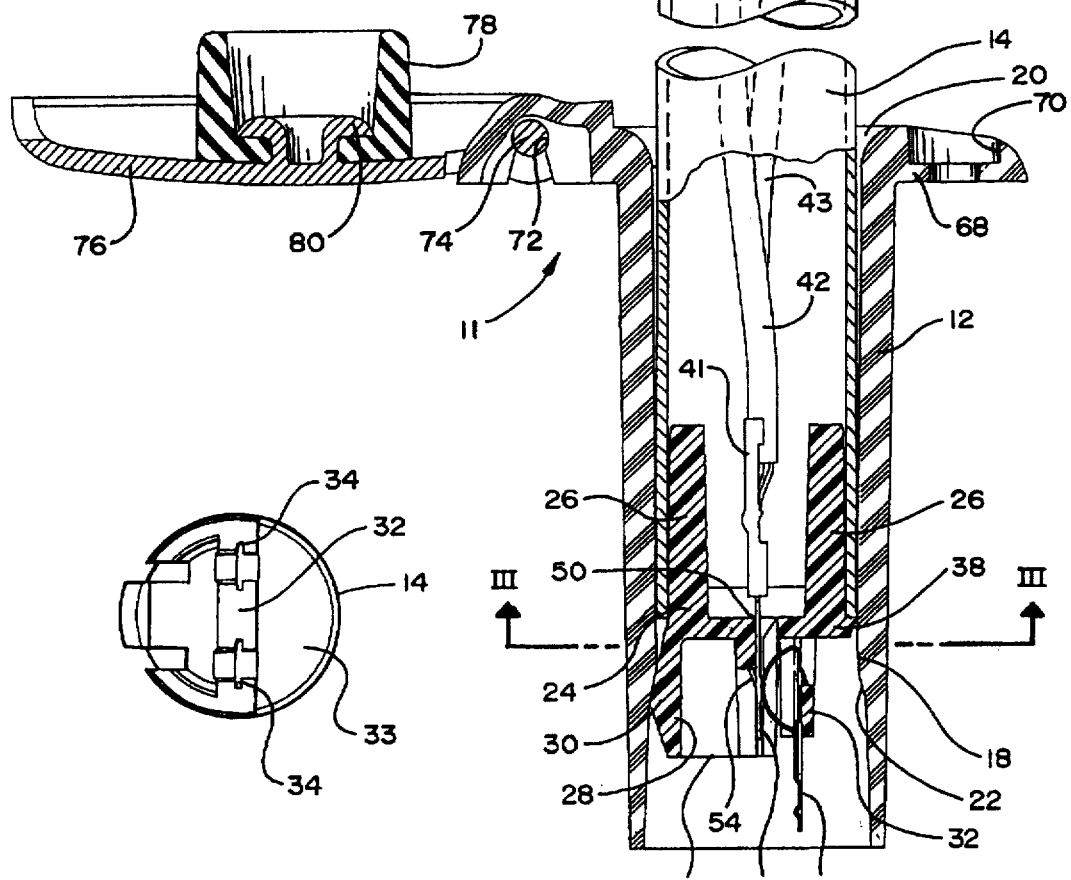
FIG. 3 is a transverse cross-sectional view along lines II—II of FIG. 2.

The lower portion of the cylindrical passageway 18 includes an internal wall 32 having a pair of slots 34 for receiving a pair of stainless steel electrical contacts 36, as can be seen in FIGS. 1–3. The electrical contacts 36 are wired to an electrical source of the marine craft. The internal wall acts as a stop for supporting the base 38 of the connector 24, and to indicate complete insertion by limiting the extent to which the pole 14 can be inserted into the receptacle 12. The internal wall 32 and the walls of the cylindrical passageway 18 together define a D-shaped socket 33 in receptacle 12 for receiving a D-shaped plug 35 formed by skirt 28 on connector 24 at the bottom end of pole 14.

Connector 24 also includes a pair of slots 50 (only one of which is shown in FIG. 2) for receiving a pair of electrical contacts 40 which are electrically connected to terminals on a light bulb via electrically cordonductive wires 42, 43. Electrical contacts 36 and 40, details of which can be seen in FIGS. 4a and 4b, respectively, are designed so that each of the contacts 40 on the pole 14 wipingly engages a corresponding one of the contacts 36 mounted on the receptacle 12. Contacts 40, shown in FIG. 4b, are generally flat and include an upper terminal receiving end 44 having an aperture 46 through which the end of an electrically conductive wire is inserted and electrically joined thereto such as with solder, and a lower wiping contact end 48. Alternately, as shown in FIG. 2, an electrical connector 41 can be soldered to the wire and slid over end 44 to establish the electrical connection. The contacts 40 are secured within slots 50 in base 38 by a pair of outwardly projecting stops 52 which are supported on the top surface of base 38, and a resiliently biased tang 54 which projects outwardly from the plane of the generally flat contact 40 and engages a bottom surface of the base 38. The dependent flange skirt 28 together with the contacts 40 define the generally D-shaped plug 35 which fits within the D-shaped socket 33 of receptacle 12.

Figure 4A:
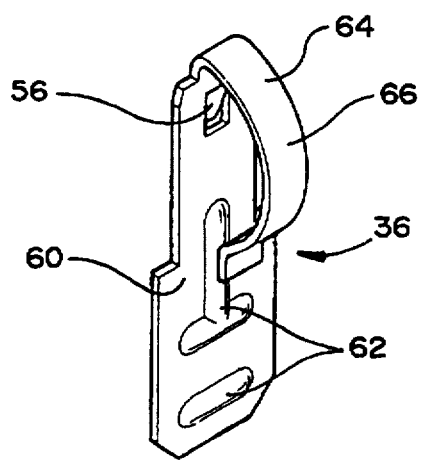
FIG. 4a is an enlarged perspective view of the electrical contacts which are secured to the receptacle.
Figure 4B:
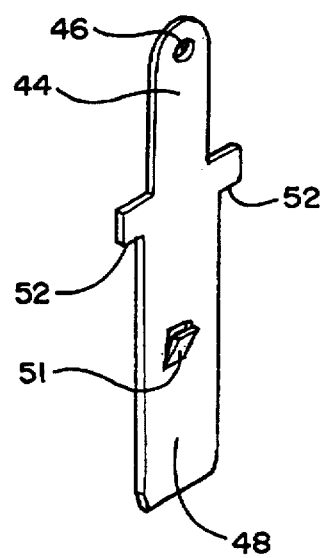
FIG. 4b is an enlarged perspective view of the electrical contacts which are secured to the pole.

Contacts 36, shown in FIG. 4a, are slid into slots 34 in the internal wall 32 of receptacle 12 from the bottom and retained therein by a resiliently biased outwardly projecting tang 56 which engages a top edge surface of an opening 58 in the wall 32. Contact 36 includes a generally flat or planar section 60, the lower end of which is a terminal receiving end having embossed ridges 62. Ridges 62 strengthen the terminal receiving end which is electrically connected to an electrical power supply such as with a connector which can be slipped over the terminal receiving end and crimped. Contact 36 also includes a flexible, resilient outwardly extending, spring biased wiping contact arm 64 having an outward convex surface 66 which is wipingly engaged by the end 48 of contact 40 when the pole 14 is inserted into and mounted on the receptacle 12. The flexibility and resilience, or springiness, of the contact arm 64 ensures excellent electrical connection between the contacts 40 and the corresponding contacts 36. Wiping engagement between contacts 36 and 40 during insertion into, and removal of the pole from, receptacle 12 of pole base 11 serves a self-cleaning function which also helps ensure good electrical connection between the contacts 40 and 36.

With reference to FIGS. 1 and 2, pole base 11 includes, at its upper end, a mounting flange 68 having fastener openings 70 which are preferably adapted to receive countersunk threaded fasteners (not shown) for securing pole base 11 to a deck or other mounting surface of a marine craft. Flange 68 is provided with a pivot bearing 72 for receiving a pivotal hinge shaft 74 which is secured to, or more preferably, is an integrally formed part of a cap 76. Cap 76 is sized to completely cover the flange 68 and conceal the fasteners used to mount pole base 11 to the marine craft when the cap is in the closed position. A rubber sealing plug or boot 78 is secured to the underside of the cap, such as with a ranged rim retainer 80 integrally formed with the cap, so that the opening 20 of the receptacle 12 can be sealed against the entry of water when cap 76 is closed. Boot 78 is slightly larger than opening 20 to provide a tight, frictional, seal which also serves to retain cap 76 in closed position until opening is desired. The bottom end of the cylindrical passageway 18 is preferably open to allow any water or other materials which happen to enter the passageway 18 (such as while the pole 14 is being inserted into or removed from pole base 11) to drain out, such as into the bilge, thereby preventing accumulation of water or other materials which could cause the contacts 36 and 40 to corrode or otherwise interfere with the continued use and performance of the pole light assembly 10. More specifically, the passageway 18 includes an opening, at a lower end thereof, which extends over the entire area bounded by the lower edges of the walls defining the passageway.

Those skilled in the art will readily appreciate that pole base 11, pole 14, connector 24, cap 76, and boot 78 can be made from a variety of suitable materials. However, pole base 11, connector 24 and cap 76 are preferably formed of thermoplastic materials such as polypropylene and ASA/PC, respectively, so that the components can be formed, such as by injection molding, in a single operation with all of the various features thereof being integrally formed therewith. Pole 14 is preferably formed of a corrosion resistant metal such as stainless steel or chrome plated metals, or of a thermoplastic or thermoset plastic. Contacts 36 and 40 are formed of an electrically conductive material which preferably exhibits excellent corrosion resistance. Stainless steel is preferred because of its outstanding balance of electrical properties, corrosion resistant properties, and relatively low cost. Boot 78 can be formed of any suitable material which will sealingly engage the inner walls of opening 20 and passageway 18 when cap 76 is closed. Durable, resiliently flexible elastomeric materials, such as natural and synthetic diene rubbers, are preferred materials for use in preparing boot 78.

Figure 5:
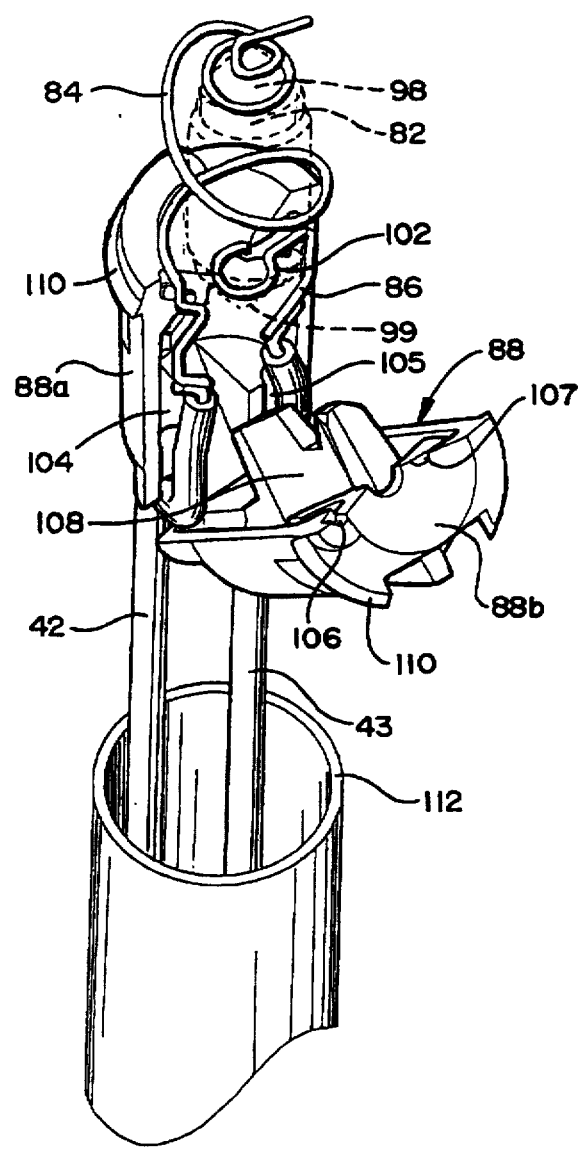
FIG. 5 is a perspective view of the wire form bulb retainer and connector at the upper end of the pole light shown in FIGS. 1 and 2.

As is best seen in FIGS. 2 and 5, light assembly 16 mounted at the top end of pole 14 generally comprises a lightbulb 82, held by a two-part, wire form, bulb retainer comprising an upper retainer 84 and a lower retainer 86; a bulb connector 88 which grips portions of the wire form retainers 84, 86 to hold them in fixed relationship to one another and to the pole 14; a base 90 which holds connector 88, retainers 84, 86, and bulb 82 to the pole 14; a reflector 92; a hemispherical lens 94; and a light limiter cap 96.

The bulb 82 is of the double festoon type having a pair of cone-shaped, metallic electrical terminals 98, 99 on opposing ends of a cylindrical, glass bulb element 100 having a filament 101. Upper retainer 84 has a conical spiral section which engages upper cone-shaped terminal 98 of bulb 82. The lower end of retainer 84 is held by connector 88 and is electrically joined, such as with solder, to one of the wires 42. Lower retainer 86 includes a circular wire form 102 at one end, which is engaged by lower cone-shaped terminal 99 to support bulb 82. The other end of retainer 86 is held by connector 88 and is electrically joined to the other wire 43. The retainers 84 and 86, therefore, serve the dual function of holding the bulb 82 generally in axial alignment with pole 14 such that element 101 is generally parallel and axially aligned with the pole, and conducting electrical current to the terminals 98 and 99 thereof. Preferably, retainers 84, 86 are formed from stainless steel. By both supplying electricity to the bulb and holding the bulb in position with a two-part wire form retainer, obstruction of light is minimized as compared with conventional retainers and/or electrical contacts stamped from conductive sheet metal. In addition, the assembly is lighter and less expensive to manufacture.

Connector 88 is preferably formed in two halves 88a and 88b, such as by injection molding of a thermoplastic material, preferably polypropylene, to facilitate fabrication of all of the various details which are needed to properly hold retainers 84 and 86 at the upper end of pole 14. In a preferred embodiment, halves 88a, 88b are joined by a living hinge. The connector details include lower openings 104, 105 through which wires 42, 43 pass to retainers 84, 86, upper openings 106, 107 through which retainers 84, 86 pass, partition 108 which projects between and prevents retainers 84 and 86 from contacting one another within the connector 88 when halves 88a, 88b are closed; and an outwardly projecting circumferential flange or ridge 110, the underside of which engages, and is supported by, the upper edge 112 of the wall of tubular pole 14. Lower openings 104, 105 of connector 88, through which wires 42 and 43 pass, are preferably sized to firmly grip the insulated wires 42, 43. Slack on the wires is preferably provided between the openings and the ends of retainers 84, 86 to which the wires are electrically connected, so that connector 88 provides strain relief for the wires 42, 43. Halves 88a and 88b can, if desired, be joined together when closed such as by ultrasonic welding or with adhesives. Connector 88 has a diameter which is sized to engage the inner walls of tubular pole 14 so that the connector is held in place by a frictional interference fit.

Figure 6:
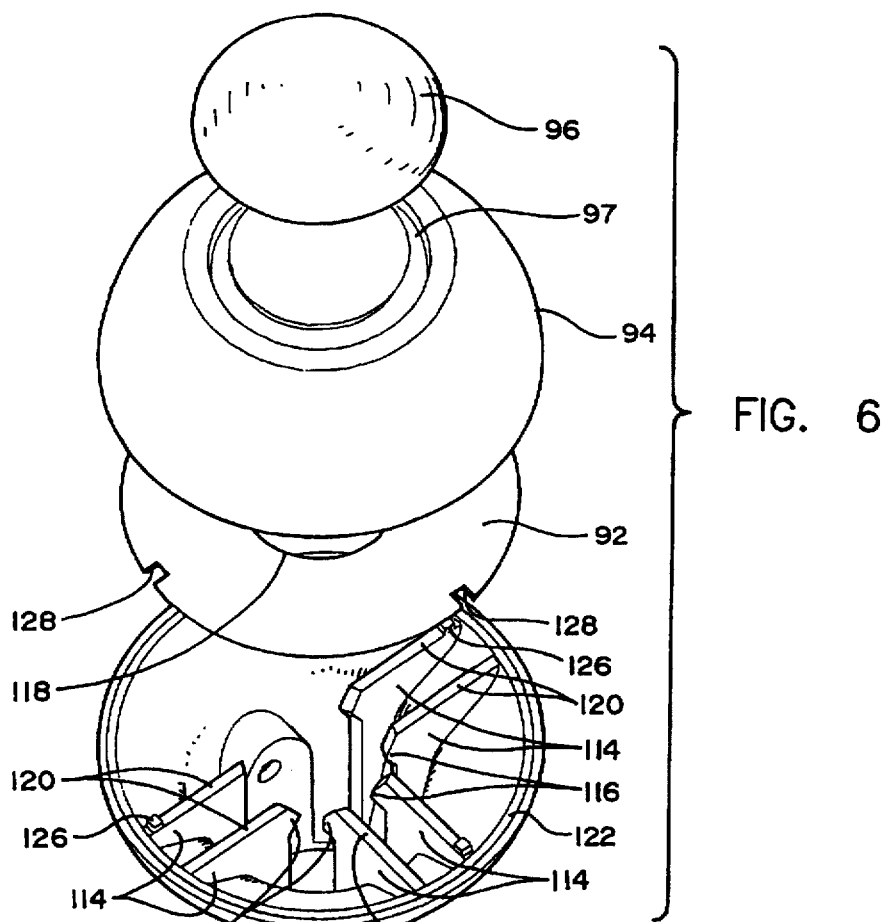
FIG. 6 is an exploded perspective view showing the assembly of the all-around light shown in FIGS. 1 and 2.

Light base 90 has an inverted bell-like shape (FIGS. 1 and 2), is preferably molded from ASA/PC, and includes a plurality of internal gussets 114 (FIGS. 2 and 6) having radially inwardly pointing projections 116 which hold connector 88 to pole 14 when pole light assembly 10 is completely assembled. In particular, the undersides of pointed projections 116 engage connector 88 along the periphery of flange or ridge 110 thereof.

Figure 7:
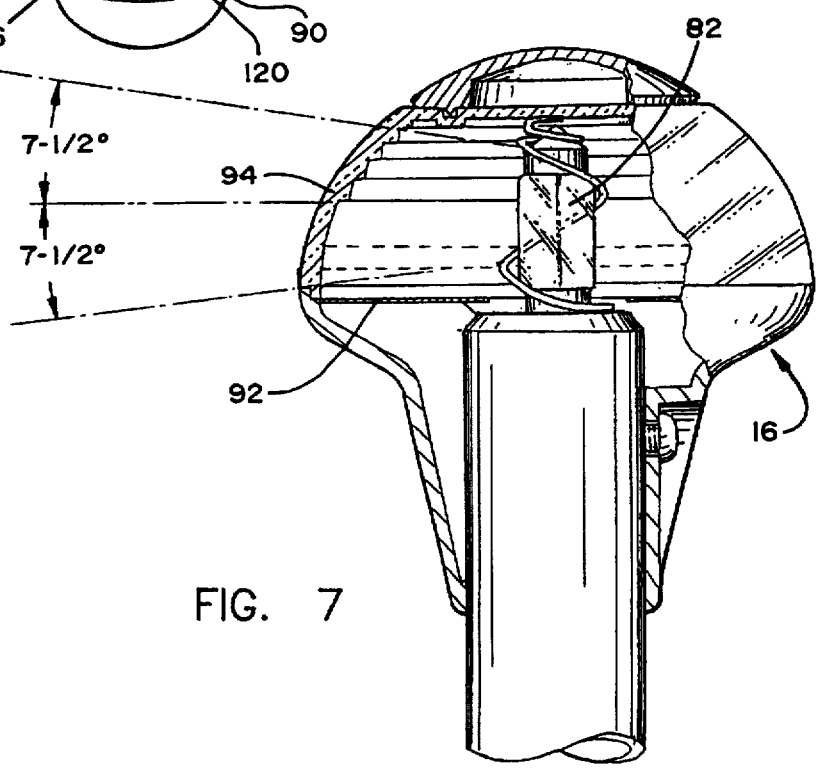
FIG. 7 is a diagram showing how light is reflected off of the reflector and out through the lens of the light shown in FIGS. 1 and 2.

A planar reflector 92 having a circular shape with a concentric circular bulb opening 118 (FIG. 6) is supported on the upper edges 120 of gussets 114. When so positioned, the plane reflector 92 is, generally perpendicular to the axis of pole 14, bulb 82 and filament 101. Reflector 92 can be made of any suitably heat resistant material capable of withstanding the temperatures which can arise during illumination of bulb 82, and which can be provided with a highly reflective upper surface. A stainless steel reflector having a highly polished, highly reflective upper surface is presently preferred. Reflector 92 redirects light outwardly through hemispherical lens 94 to help maximize utilization of light emitted from bulb 82, thereby permitting use of a smaller wattage bulb which generates less heat, uses less energy, and which can be housed in a smaller, more compact lighting assembly. FIG. 7 shows how light emitted from bulb 82 is reflected off reflector 92 and out through lens 94 of light assembly 16. The beam of light passing outwardly through lens 94 of light assembly 16 extends about 7.5 degrees upwardly and downwardly from a horizontal plane, as shown in FIG. 7.

Figure 8:
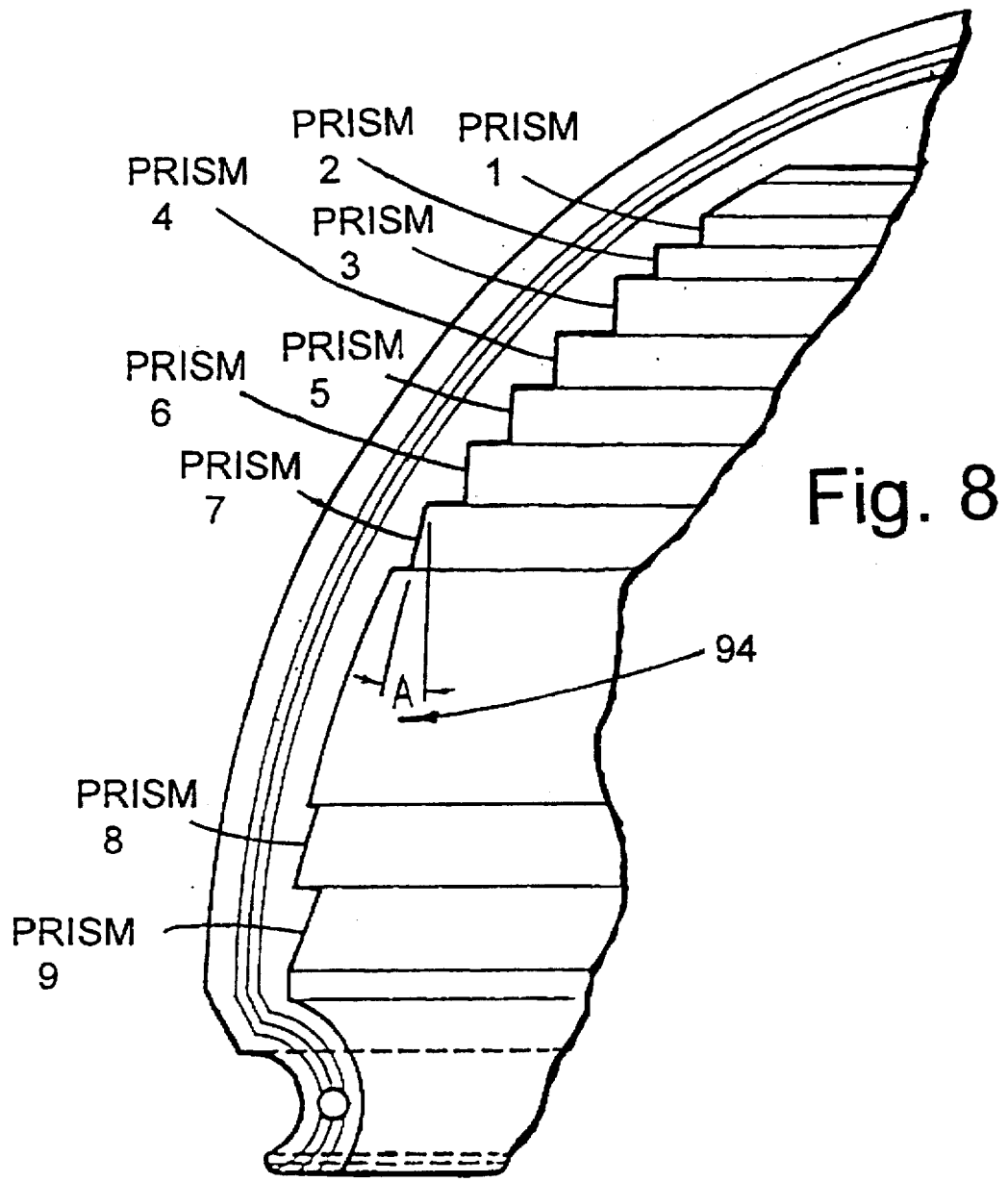
FIG. 8 is an enlarged, fragmentary, cross-sectional, side elevational view showing details of the prismatic surfaces of a lens used in the light assembly.

Hemispherical lens 94 is secured to an outer circumferential rim 122 of base 90. Lens 94 is preferably a Fresnel-type lens having an upper aperture 95 through which bulb retainer 84 and bulb end 98 project, and a plurality of internal facets or prisms which generally redirect the light from bulb 82 so that it radiates outwardly from the lens in a generally horizontal direction for 360 degrees around the light assembly to help maximize the amount of light which will be visible to a person or another marine craft, such as a person within a two mile radius of pole light assembly 10. Accordingly, use of a hemispherical Fresnel lens 94 in combination with a reflector 92 allows the use of a still smaller wattage bulb and a smaller light assembly. The lens 94 preferably radiates a beam of light which is continuous from about 7.5 degrees below the horizon to about 7.5 degrees above the horizon. FIG. 8 shows details regarding suitable dimensions of the prismatic surfaces of lens 94. The angle "A" between the face of the prisms and a horizontal plane are as follows:

| PRISM | A |
| --- | --- |
| 1 | 0.5° |
| 2 | 0.5° |
| 3 | 0.5° |
| 4 | 0.5° |
| 5 | 0.5° |
| 6 | 15.0° |
| 7 | 5.0° |
| 8 | −7.5° |

The lens is preferably formed, such as by injection molding, of a thermoplastic material having outstanding optical clarity and good mechanical properties and durability. Suitable materials include clear polycarbonate and polymethyl methacrylate.

Light limiter cap 96, preferably molded from ASA/PC, is secured to the top of hemispherical lens 94 by any suitable means such as mechanical engagement between projection 95 and groove 97 on the cap 96 and lens 94, respectively, in conjunction with thermal fusion as by ultrasonic welding. Cap 96 helps prevent light from being radiated upwardly thus reducing glare seen by the boat driver and other occupants, and preferably includes a bottom surface which is at least partially reflective to help redirect light out of the lens 94.

Base 90, reflector 92, lens 94, and cap 96 are preferably preassembled to form an integrated housing which slides over connector 88 with retainers 84, 86 and bulb 82 and pole 14, and which is secured to the pole 14 such as with a threaded fastener 123 which passes through a fastener opening 124 (FIG. 2) in the base and through a corresponding opening in the pole.

Reflector 92 can be secured to a thermoplastic base 90 by placing the reflector on the gussets 114 with upward projections 126 properly aligned with slots 128 so that the planar reflector 92 lies flat against, and is in substantially continuous contact with the upper edges 120 of gussets 114. Projections 126 can then be heat staked by heating (to a temperature which causes the thermoplastic to flow) and deforming so that the material which constituted the projection 126 is spread outwardly over the reflector 92 in the area immediately adjacent the slot 128. After cooling, the material resolidifies to form a retainer which holds the reflector 92 to the base. Alternative means, such as adhesives, can be used if desired.

Lens 94 can be secured to the base to seal out water by any of a variety of methods, such as with adhesives. A preferred method is to thermally fuse the edges of the lens to the edges of the base, such as by using ultrasonic welding techniques.

An appropriate assembly procedure for the pole 14 and receptacle 12 will be obvious to those having ordinary skill in the art and will only be briefly explained herein.

Assembly of the pole can be achieved by soldering one end of each of wires 42, 43 to a corresponding retainer 84, 86, and connecting or soldering the other end of each wire 42, 43 to the corresponding contacts 40. Contacts 40 are then inserted and locked into slots 50 in the base 38 of connector 24. Retainers 84, 86 can then be passed through a pole 14 of appropriate length so that they emerge at one end thereof, and connector 24 can be inserted into the other end. Retainers 84, 86 and wires 42, 43 can then be appropriately positioned at the openings along the seam between the two connector halves 88a, 88b, and the two connector halves can be inserted together into the end of the tube to complete assembly of the pole.

Assembly of pole base 11 involves fitting a boot 78 over retainer 80, snapping the hinge 74 into the bearing 72 to allow pivotal movement of cap 76 between open and closed positions, and inserting contacts 36 into slots 34.

The pole light assembly 10 is prepared for use by inserting a bulb 82 between the retainers 84 and 86, sliding the housing (comprising of base 90, reflector 92, lens 94, and cap 96) over the bulb end of the pole 14 and screwing a threaded fastener through the opening 124 and through a corresponding opening in the pole.

The pole 14 is mounted onto pole base 11 by opening hinged cap 76 and inserting the bottom end thereof into the cylindrical passageway 18 of receptacle 12 through opening 20 with the D-shaped plug 35 on the pole properly lined up with the D-shaped socket 33 in the passageway of the receptacle. Pole 14 is pushed into the passageway 18 until the underside of the base 38 of connector 24 engages the internal wall 32, and detent 30 on skirt flange 28 engages the shoulder 22 in the passageway. The interference fit between detent 30 and shoulder 22 is of sufficient force to prevent the pole from disengaging from the receptacle on account of normal movement of the marine craft relative to the water, yet low enough to allow easy removal of the pole by simply pulling it up out of the receptacle. Accordingly, the invention provides an electrically powered pole light assembly which is easily mounted onto (and dismounted from) a receptacle base (which supports and supplies electrical current to the pole light via internal electrical contacts) without having to twist or rotate the pole and without having to manually engage connectors or fasteners.

It will be understood by those who practice the invention and by those skilled in the art, that various modifications and improvements may be made to the invention without departing from the spirit of the disclosed concept. The scope of protection afforded is to be determined by the claims and by the breadth of interpretation allowed by law.

The embodiments of the invention in which an exclusive property or privilege is claimed are defined as follows.

We claim:

1. A pole light assembly for a marine craft, comprising:
a receptacle body including a passageway with an open upper end and a keyed socket, and a pole including an upper end to which is secure a light assembly and a lower end having a plug which is keyed to be received within said socket, said pole including a pair of electrical contacts, each of which is wipingly engaged by a corresponding electrical contact in said receptacle when said pole with said plug is inserted into said socket; each of said electrical contacts in said receptacle having a flexible arm which engages and is resiliently biased toward said contacting surface of one of said electrical contacts on said pole when said pole is inserted into said receptacle; said receptacle including a cap which is pivotally secured to said receptacle body by a laterally extending hinge shaft, said cap being pivotable about said hinge shaft between an open position wherein said lower end of said pole can be inserted into said passageway of said receptacle, and a closed position wherein the open upper end of said passageway is covered by said cap; and said cap including a resilient boot secured to an underside thereof, said resilient boot being closely received in and sealing said open upper end of said passageway when said cap is in the closed position, said resilient boot being attached to said cap so that said resilient boot is automatically located centerally in said open upper end of said passageway when said cap is rotated about said hinge shaft from the open position to the closed position.

2. The pole light system of claim 1, wherein said receptacle includes at least one aperture for receiving a fastener for securing said receptacle to a surface of a marine craft, and said cap being adapted to cover and conceal said aperture when said cap is in the closed position.

3. The pole light system of claim 1, wherein said socket and said plug have a non-circular transverse cross-sectional shape which limits insertion of the pole into the socket to a finite number of selectable orientations.

4. The pole light assembly of claim 1, wherein said passageway of said receptacle has an opening at a bottom thereof to allow water and other materials to drain therefrom, said opening extending over an entire area bounded by lower edges of walls defining said passageway.

5. The pole light assembly of claim 1, wherein said passageway includes an internal shoulder, and said pole includes a depending flange skirt having an external detent which engages said shoulder to secure said pole to said receptacle by a frictional interference fit when said pole is inserted into said passageway.

6. The pole light assembly of claim 1, wherein said flexible arm of said electrical contacts in said receptacle have a convex surface which engages said contacting surface of one of said electrical contacts on said pole when said pole is inserted into said receptacle.

7. A pole base for receiving a pole having a light secured to one end, and a keyed plug and a pair of electrical contacts on the other end, comprising:

a receptacle body with a passageway with an open upper end and a keyed socket adapted to receive the plug on the pole, and a pair of electrical contacts in said passageway, each of which engage a corresponding electrical contact on the pole when the pole is inserted into said passageway, each of said electrical contacts in said receptacle having a flexible arm which engages and which is resiliently biased toward a corresponding electrical contact on the pole when the pole is inserted into said passageway; said receptacle including a cap which is pivotally secured to said receptacle body by a laterally extending hinge shaft, said cap being pivotable about said hinge shaft between an open position wherein said lower end of said pole can be inserted into said passageway of said receptacle, and a closed position wherein the open upper end of said passageway is covered by said cap; and said cap including a resilient boot secured to an underside thereof, said resilient boot being closely received in and sealing said open upper end of said passageway when said cap is in the closed position, said resilient boot being attached to said cap so that said resilient boot is automatically located centerally in said open upper end of said passageway when said cap is rotated about said hinge shaft from the open position to the closed position.

8. The pole base of claim 7, wherein said receptacle includes at least one aperture for receiving a fastener for securing said receptacle to a surface of a marine craft, and said cap being adapted to cover and conceal said aperture when said cap is in the closed position.

9. The pole base of claim 7, wherein said socket is substantially D-shaped.

10. The pole base of claim 7, wherein said passageway of said receptacle has an opening at a bottom thereof to allow water and other materials to drain therefrom, said opening extending over an entire area bounded by lower edges of walls defining said passageway.

11. The pole base of claim 7, wherein said passageway includes an internal shoulder for engagement with a detent on the plug of the pole to secure the pole to the receptacle by a frictional interference fit when the pole is inserted into said passageway.

* * * * *

UNITED STATES PATENT AND TRADEMARK OFFICE
CERTIFICATE OF CORRECTION

PATENT NO. : 5,704,704
DATED : JANUARY 6, 1998
INVENTOR(S) : BRENT A. REICHARD, BRUCE RENIGER, and TERRY L. LAUTZENHEISER, CLIFTON J. RATZA It is certified that error appears in the above-identified patent and that said Letters Patent is hereby corrected as shown below:

On the title page

Abstract, Line 14;

"utilize" should be --utilizes--.

Column 4, line 12;

"cordonductive" should be --conductive--.

Column 4, line 66;

"ranged" should be --flanged--.

Column 8, claim 1, line 49;

"secure" should be --secured--.

Signed and Sealed this

Fifth Day of May, 1998

*Attest:*

BRUCE LEHMAN

*Attesting Officer*        *Commissioner of Patents and Trademarks*